2,889,253

ZIRCONIUM CONTAINING ANTI-PERSPIRANT COMPOSITIONS

Frank M. Berger, Princeton, and Sophie L. Plechner, Metuchen, N.J., assignors to Carter Products, Inc., New York, N.Y., a corporation of Maryland No Drawing. Application June 14, 1956
Serial No. 591,279

5 Claims. (Cl. 167—90)

This invention relates to perspiration retarding or inhibiting compositions and more particularly to effective compositions for this purpose which incorporate compounds of zirconium.

It is desirable to provide compositions that will inhibit or prevent the flow of perspiration from limited areas of the human skin for limited time intervals. Although the action of such compositions is not fully understood, it is known that to be effective, they must be water-soluble. It is further known that many compositions that are otherwise effective for this purpose are undesirable because they irritate the skin or attack and deteriorate clothing fibers with which they come in contact, particularly when the fabrics are subjected to high temperatures, as in ironing. Many known compositions are subject to both of these objections. Our improved compositions are harmless to both the skin and fabrics.

There are three principal classes of zirconium salts, none of which is useful as a perspiration inhibiting composition. By the term "perspiration inhibiting or retarding composition," we mean compositions, the essential action of which is to stop or retard the flow of perspiration from the human skin, and not compositions that merely mask or destroy odors of or that result from perspiration flow. The three classes of zirconium salts are, first, the soluble inorganic acid salts, typical of which are zirconium sulfate, zirconium chloride, and zirconium oxychloride; second, the relatively soluble zirconium salts of hydroxy aliphatic carboxylic acids, typical of which are sodium zirconium lactate, sodium zirconium glycolate and sodium zirconium gluconate; and third, the relatively insoluble zirconium salts of hydroxy aliphatic carboxylic acids typical of which are zirconium lactate, zirconium glycolate and zirconium gluconate. The inorganic acid salts of zirconium, although quite soluble in water, produce solutions that are so highly acidic as to intensely irritate the skin and cause acid burns, and for this reason their perspiration inhibiting properties, if in fact they possess any, cannot be evaluated and they are useless for retarding and inhibiting perspiration flow.

We have discovered that highly effective perspiration inhibiting compositions can be prepared by combining zirconium salts from the second and third classes enumerated above. Thus, we have found that highly effective perspiration inhibiting compositions can be prepared by employing as the active ingredients thereof a mixture of sodium zirconium lactate and zirconium lactate. With this combination of compounds serving as its sole active constituent, there is produced a composition which not only stops or effectively retards the flow of perspiration from treated areas of the skin, but which is non-irritating to the skin and non-injurious to fabrics.

For effective use, the active ingredients of the compositions of this invention should be combined in water or in an aqueous carrier, such as the aqueous phase of a cream, emulsion, lotion, stick or spray.

Compositions in accordance with our invention are effective over a wide range of proportions as between the relatively soluble and the relatively insoluble organic zirconium lactate salts. Thus, the proportions may range from about 90% sodium zirconium lactate with 10% zirconium lactate to about 10% or less of sodium zirconium lactate with 90% or more of zirconium lactate. We generally prefer to employ such proportions of the essential active ingredients as will produce a composition having a pH value substantially within the range of about 2.5 to 5.5. Aqueous mixtures exhibiting pH values within this range are, for example, obtained by combining the ingredients in the proportions from about 60% sodium zirconium lactate with about 40% zirconium lactate to less than 10% sodium zirconium lactate with over 90% zirconium lactate.

Our improved anti-perspirant compositions may be prepared in any desired form, including spray solutions, emulsions, lotions, creams, sticks and the like, which include an aqueous carrier.

Our novel combination of active ingredients can be incorporated into cream bases which will maintain the compositions in contact with the skin over extended periods. The cream base forming materials may vary widely in composition but will generally comprise an oily phase held in dispersion by a suitable emulsifier in an aqueous phase which carries the combined zirconium salts, a humectant also preferably being present.

The oily phase of the base may include natural and synthetic oils, waxes and fats, including spermaceti, paraffin, mineral oils, sterols, vegetable oils, and other esters of fatty acids. The emulsifier may comprise any suitable known emulsifying agent, and those found useful include partial esters of fatty acids with glycerine, glycol, or other polyhydric alcohols and their polyoxyethylene ethers, including stabilizers such as sodium salts of sulfated mono-glycericides of coconut oil fatty acids, sodium alkyl sulfates, salts of alkyl aromatic sulfonates, etc. Specific emulsifiers suitable for use in the cream base include sodium polyethylethene amid-sulfonate (obtainable under the trade name "Igepon T"), sorbitan monolaurate, monopalmitate, and monostearate polyoxyethylene derivatives (obtainable under the trade names "Tween 20" to "Tween 80"), alkylated aryl polyether alcohol (obtainable under the trade name "Triton X45"), and the triethanolamine salt of alkyl aryl sulfonate (obtainable under the trade name "Ultrawet 60L"). Suitable humectants include glycerine, sorbitol and propylene glycol.

The novel ingredients can be incorporated into a lotion which permits the application of the active ingredients in a convenient manner and maintains the composition in contact with the skin over extended periods. The lotion generally consists of an emulsified mixture of the active ingredients in an aqueous phase and a suitable non-aqueous phase. The non-aqueous phase may include natural and synthetic waxes including cetyl alcohol, mineral oils, fatty acid esters and the like. The two phases are generally maintained in stable condition by the use of a suitable emulsifying agent such as the polyethylene esters of higher fatty alcohols. A suitable humectant such as glycerine or propylene glycol may also be employed.

The active ingredient may also be incorporated into a suitable solid wax type stick composition. Such a stick base consists of a mixture of natural and synthetic wax-like materials in such proportions that a soft wax-like composition capable of admixing with the aqueous phase is obtained. Because of the pH range required for our active ingredients, the cologne-type stick, which has a pH of about 8, cannot be used.

The active ingredients may be dissolved in a suitable mixture of liquid ingredients to obtain a solution suitable for application to the skin by means of a spray forming device. In addition to the active ingredients, such spray solutions contain suitable proportions of alcohol and water along with minor proportions of humectant and surface active agent. The humectant may consist of propylene glycol, glycerine, polyethylene glycol, and the surface active agent may consist of polyoxyethylene fatty alcohol, polyethylene ether of higher fatty alcohol, and similar non-ionic detergents.

The following are specific examples of cream preparations incorporating our novel perspiration inhibiting composition, the proportions of ingredients being given in approximate percentages by weight.

Example I

| | Percent |
|---|---|
| Petrolatum | 1 |
| Spermaceti wax | 3 |
| Glycerol monostearate | 13 |
| Glycerine | 10 |
| Water | 44 |
| Triethanolamine salt of alkyl aryl sulfonate | 10 |
| Sorbitan monostearate polyoxyethylene derivative | 3 |
| Titanium dioxide | 1 |
| Zirconium lactate | 5 |
| Sodium zirconium lactate | 10 |

Example II

| | Percent |
|---|---|
| Petrolatum | 2 |
| Spermaceti wax | 2 |
| Glycerol monostearate | 9 |
| Glycerine | 12 |
| Water | 52 |
| Polyethylene glycol monostearate | 5 |
| Sorbitan monopalmitate polyoxyethylene derivative | 2 |
| Titanium dioxide | 1 |
| Sodium zirconium lactate | 10 |
| Zirconium lactate | 5 |

An example of a lotion composition is as follows:

Example III

| | Percent |
|---|---|
| Sodium zirconium lactate | 12 |
| Zirconium lactate | 3 |
| Polyethylene ether of higher fatty alcohols | 2.5 |
| Propylene glycol | 10 |
| Cetyl alcohol | 0.5 |
| Water | 72 |
| Perfume | Q.s. |

An example of a stick composition is as follows:

Example IV

| | Percent |
|---|---|
| Sodium zirconium lactate (43% soln.) | 28 |
| Zirconium lactate | 3 |
| Propylene glycol | 25 |
| Polyethylene glycol esters | 15 |
| Fatty alcohol | 10 |
| Hard wax | 5 |
| Paraffin | 5 |
| Water | 9 |

An example of a spray composition is as follows:

Example V

| | Percent |
|---|---|
| Sodium zirconium lactate (43% soln.) | 20 |
| Zirconium lactate | 2 |
| Polyethylene fatty alcohol | 0.3 |
| Propylene glycol | 10 |
| Alcohol S.D.A. 40 | 20 |
| Water | 47.7 |
| Perfume | Q.s. |

Although we have given a number of specific examples of compositions embodying our invention, it should be understood that the invention is not limited to these examples but includes all such compositions as fall within the scope of the appended claims.

The present application is a continuation-in-part of application Serial No. 303,001, filed August 6, 1952, now Patent No. 2,790,747.

We claim:

1. A perspiration inhibiting preparation comprising the combination, in an aqueous carrier, of sodium zirconium lactate and zirconium lactate, said preparation having a pH in the range of 2.5 to 5.5.

2. A perspiration inhibiting preparation according to claim 1, in the form of a cream comprising an aqueous phase and an oily phase in which the aqueous carrier comprises the aqueous phase and in which the oily phase is held in dispersion by means of an emulsifier.

3. A perspiration inhibiting preparation according to claim 1, in the form of a lotion comprising an aqueous phase and a non-aqueous phase in which the aqueous carrier comprises the aqueous phase and in which the non-aqueous phase is held in dispersion by means of an emulsifier.

4. A perspiration inhibiting preparation according to claim 1, in the form of a stick comprising a wax base and an aqueous phase, said aqueous phase comprising the aqueous carrier for the active ingredients.

5. A perspiration inhibiting composition according to claim 1 wherein the sodium zirconium lactate is in an amount from about 10% to about 60% by weight of the active ingredients and the zirconium lactate is in an amount from about 90% to about 40% by weight.

References Cited in the file of this patent

UNITED STATES PATENTS

| 2,236,387 | Wallace | Mar. 25, 1941 |
| 2,498,514 | Van Mater | Feb. 21, 1950 |
| 2,732,327 | Teller | Jan. 24, 1956 |
| 2,734,847 | Berger et al. | Feb. 14, 1956 |
| 2,790,747 | Berger et al. | Apr. 30, 1957 |

FOREIGN PATENTS

| 237,624 | Germany | June 5, 1910 |